(12) United States Patent
Brooks et al.

(10) Patent No.: US 9,892,601 B1
(45) Date of Patent: Feb. 13, 2018

(54) VALET PARKING PAGING SYSTEM

(71) Applicants: Rodsudalah Brooks, Miami, FL (US); Janice Brooks, Miami, FL (US)

(72) Inventors: Rodsudalah Brooks, Miami, FL (US); Janice Brooks, Miami, FL (US)

(*) Notice: Subject to any disclaimer, the term of this patent is extended or adjusted under 35 U.S.C. 154(b) by 0 days.

(21) Appl. No.: 15/413,478

(22) Filed: Jan. 24, 2017

(51) Int. Cl.
| | |
|---|---|
| *G11B 27/10* | (2006.01) |
| *H04N 21/858* | (2011.01) |
| *G06F 1/32* | (2006.01) |
| *G08B 5/22* | (2006.01) |
| *H02J 7/00* | (2006.01) |
| *B60L 11/18* | (2006.01) |
| *G06F 1/16* | (2006.01) |
| *H04W 88/02* | (2009.01) |
| *H04W 84/02* | (2009.01) |
| *H04N 21/647* | (2011.01) |

(52) U.S. Cl.
CPC .......... *G08B 5/224* (2013.01); *B60L 11/1809* (2013.01); *G06F 1/1632* (2013.01); *G06F 1/1654* (2013.01); *H02J 7/0029* (2013.01); *H02J 7/0047* (2013.01); *H02J 7/0054* (2013.01); *H02J 2007/0059* (2013.01); *H04N 21/647* (2013.01); *H04W 84/022* (2013.01); *H04W 88/02* (2013.01)

(58) Field of Classification Search
CPC ......... H04N 21/2353; H04N 21/25816; H04N 21/64753; H04N 21/64707; H04N 21/647; G06F 1/1632; G06F 1/1654; G06F 1/266; G06F 21/44
See application file for complete search history.

(56) References Cited

U.S. PATENT DOCUMENTS

| | | | |
|---|---|---|---|
| D524,817 S | 7/2006 | Conley | |
| 8,909,136 B1 | 12/2014 | Keshishi | |
| 2009/0295568 A1 | 12/2009 | Jamchi | |
| 2011/0320405 A1* | 12/2011 | Hsu ........ | G06F 1/1632 |
| | | | 707/634 |
| 2012/0111937 A1 | 5/2012 | Rogich | |
| 2013/0066667 A1 | 3/2013 | Gulec | |
| 2013/0082102 A2 | 4/2013 | Rogic | |
| 2013/0113604 A1 | 5/2013 | Marzec | |
| 2015/0205747 A1* | 7/2015 | Dees ........ | H04M 1/7253 |
| | | | 710/303 |
| 2017/0115713 A1* | 4/2017 | Shin ........ | G06F 1/266 |
| 2017/0200476 A1* | 7/2017 | Chen ........ | G11B 27/10 |

* cited by examiner

*Primary Examiner* — Dionne H Pendleton
(74) *Attorney, Agent, or Firm* — Kyle A. Fletcher, Esq.

(57) ABSTRACT

The valet parking and paging system is a wireless signaling apparatus that facilitates communication between a valet parking station and a client of the valet parking station. Specifically, the valet parking and paging system is a wireless signaling apparatus that exchanges status information between the valet parking station and a client. The valet parking and paging system comprises a plurality of valet units, a plurality of client units, and a base stations. The plurality of valet units comprises a collection of individual valet units. The plurality of client units comprises a collection of individual client units. Each individual valet unit selected from the plurality of valet units plugs into and is electrically connected to a location selected from the group consisting of the base station or an individual client unit selected from the plurality of client units.

18 Claims, 10 Drawing Sheets

VALET PARKING PAGING SYSTEM

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including checking devices, more specifically, an apparatus related to queuing systems for checking the occurrence of a condition.

SUMMARY OF INVENTION

The valet parking and paging system comprises a plurality of valet units, a plurality of client units, and a base station. The plurality of valet units comprises a collection of individual valet units. The plurality of client units comprises a collection of individual client units. Each individual valet unit selected from the plurality of valet units plugs into and is electrically connected to a location selected from the group consisting of the base station or an individual client unit selected from the plurality of client units. The combination of an individual client unit with an individual valet unit forms an individual wireless signaling apparatus.

The valet parking and paging system is a wireless signaling apparatus that facilitates communication between a valet parking station and a client of the valet parking station. When not in use, the individual valet unit is plugged into the individual client unit for the purposes of: 1) establishing an electrical connection between the individual valet unit to the individual client unit for the purpose of establishing an identification protocol between the individual valet unit and the individual client unit; 2) using a valet battery stored within the individual valet unit to charge a client battery stored within the individual client unit; and, 3) to provide for convenient storage of the individual wireless signaling apparatus as a single item. The identification protocol establishes an identification code that allows the individual valet unit and the individual client unit to filter out communications that may be received from a second individual wireless signaling apparatus operating in the vicinity. The identification protocol is reestablished every time the individual valet unit is plugged into the individual client unit. The purpose for the reestablishment of the identification protocol is to allow for the "mixing and matching" of individual client units selected from a plurality of client units with individual valet units selected from a plurality of client units. This "mixing and matching" allows for the free interchange of components between individual wireless signaling apparatus as may be required for maintenance or management purposes.

The individual wireless signaling apparatus is prepared for use by unplugging and separating the individual valet unit from the individual client unit. When the individual wireless signaling apparatus is in use, the client of the valet parking station is given an individual client unit for use by the client through the duration of the client's engagement with the valet parking station. The associated individual valet unit is then plugged into a base station for the purposes of: 1) establishing an electrical connection between the individual valet unit and the base station for the purpose of charging the valet battery contained within the individual valet unit; and, 2) establishing an electrical connection between the base station and the individual valet unit allowing the individual valet unit to monitor and receive control signals from the base station. When in use, the individual valet unit and the individual client unit exchange a plurality of messages regarding the status of the valet parking station and vehicle of the client. The information exchanged through the plurality of messages is interpreted through a series of signals.

These together with additional objects, features and advantages of the valet parking and paging system will be readily apparent to those of ordinary skill in the art upon reading the following detailed description of the presently preferred, but nonetheless illustrative, embodiments when taken in conjunction with the accompanying drawings.

In this respect, before explaining the current embodiments of the valet parking and paging system in detail, it is to be understood that the valet parking and paging system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the valet parking and paging system.

It is therefore important that the claims be regarded as including such equivalent construction insofar as they do not depart from the spirit and scope of the valet parking and paging system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
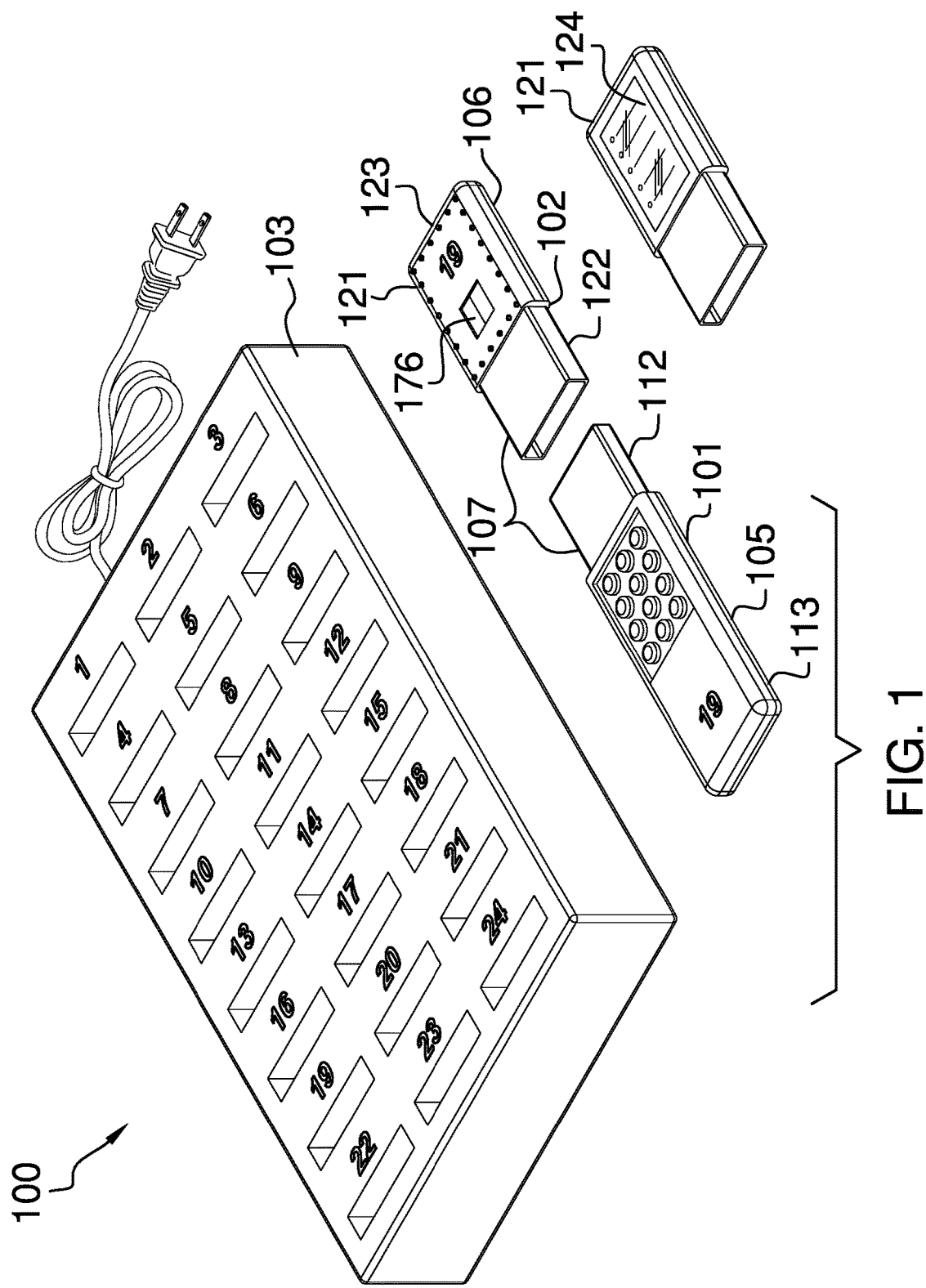
FIG. 1 is a perspective view of an embodiment of the disclosure.
Figure 2:
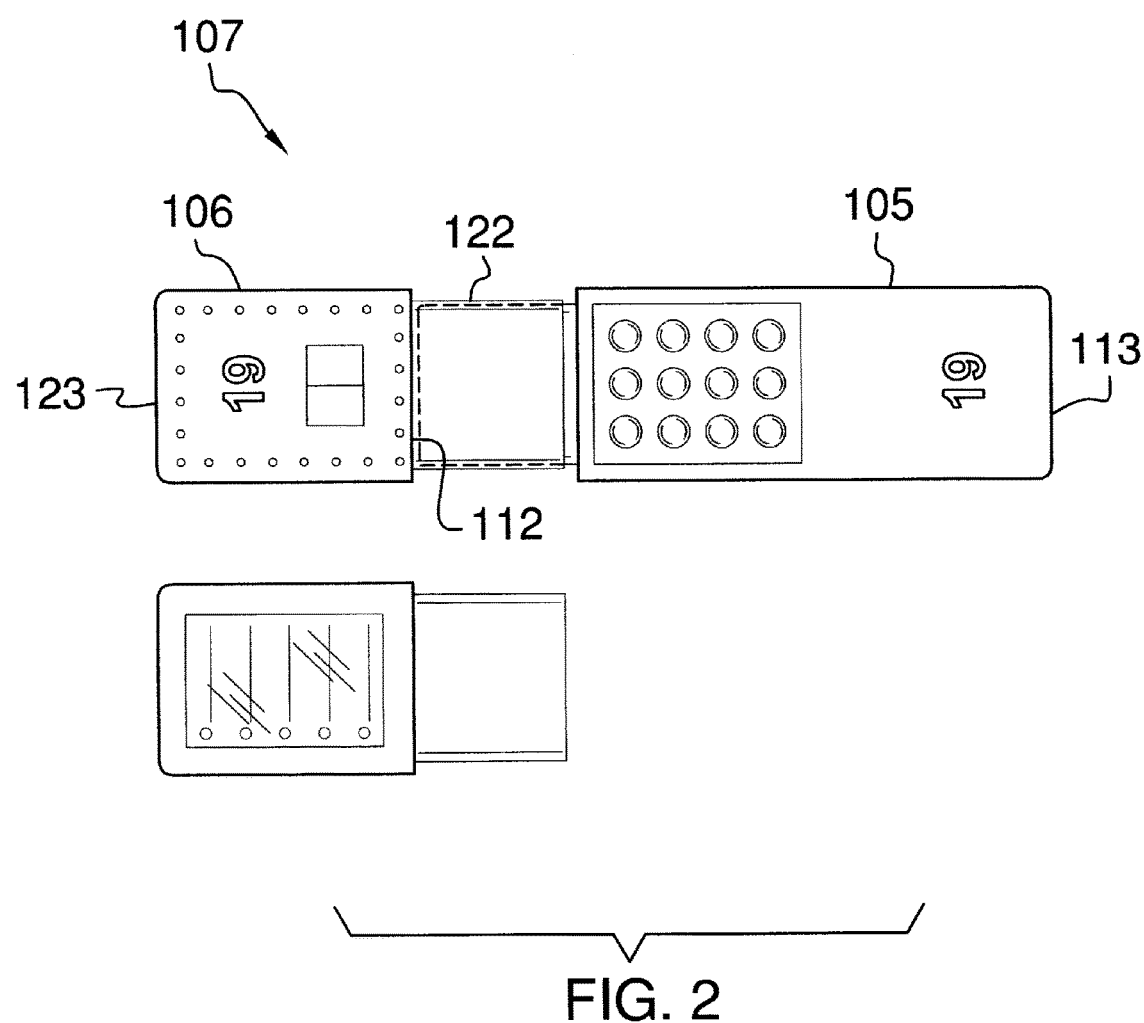
FIG. 2 is a detail view of an embodiment of the disclosure.
Figure 3:
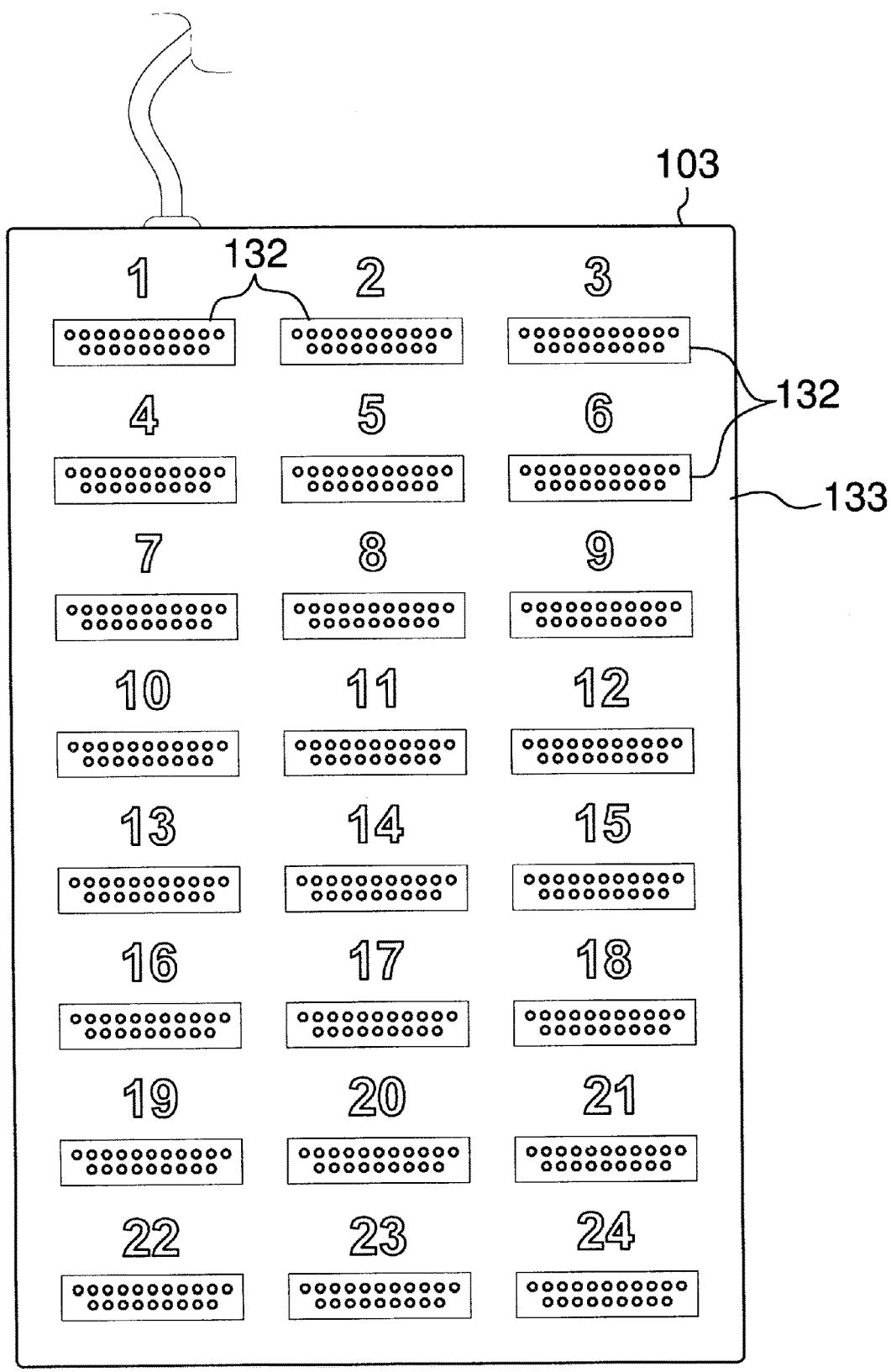
FIG. 3 is a front view of an embodiment of the disclosure.
Figure 4:
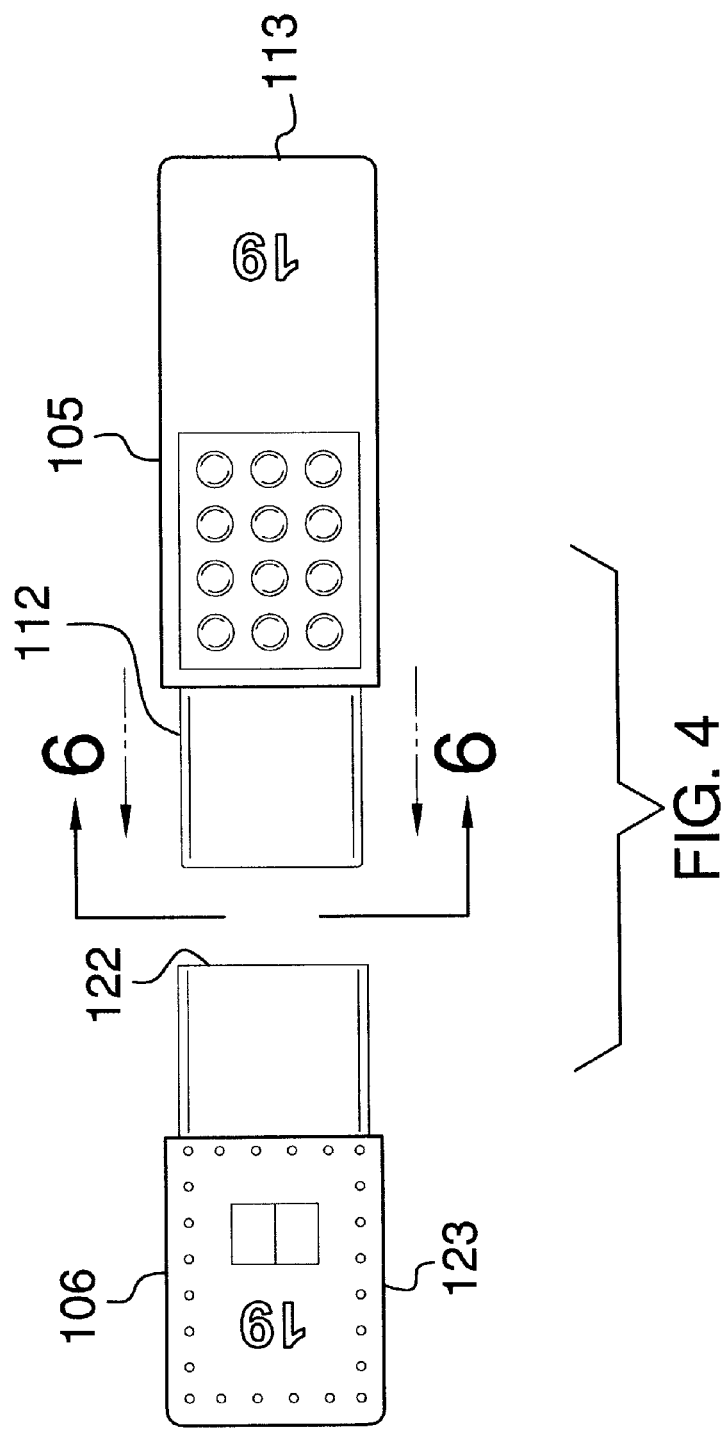
FIG. 4 is an exploded view of an embodiment of the disclosure.
Figure 5:
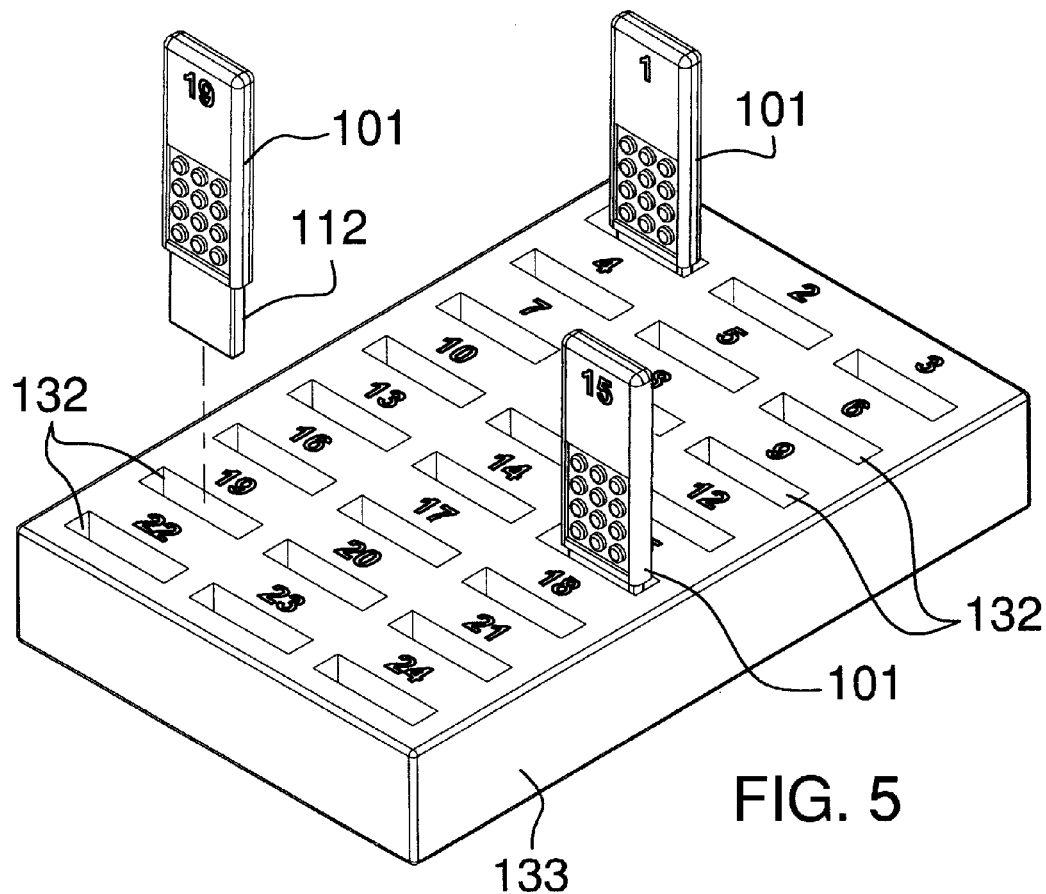
FIG. 5 is an in use view of an embodiment of the disclosure.
Figure 6:
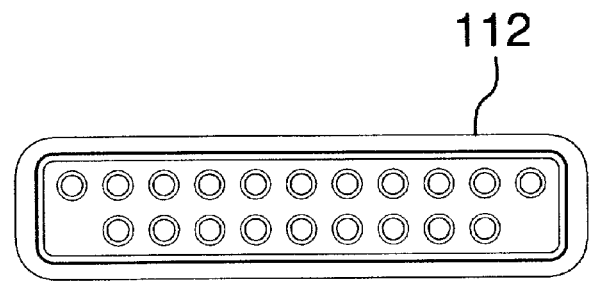
FIG. 6 is a cross-sectional view of an embodiment of the disclosure across 6-6 as shown in FIG. 4.
Figure 7:
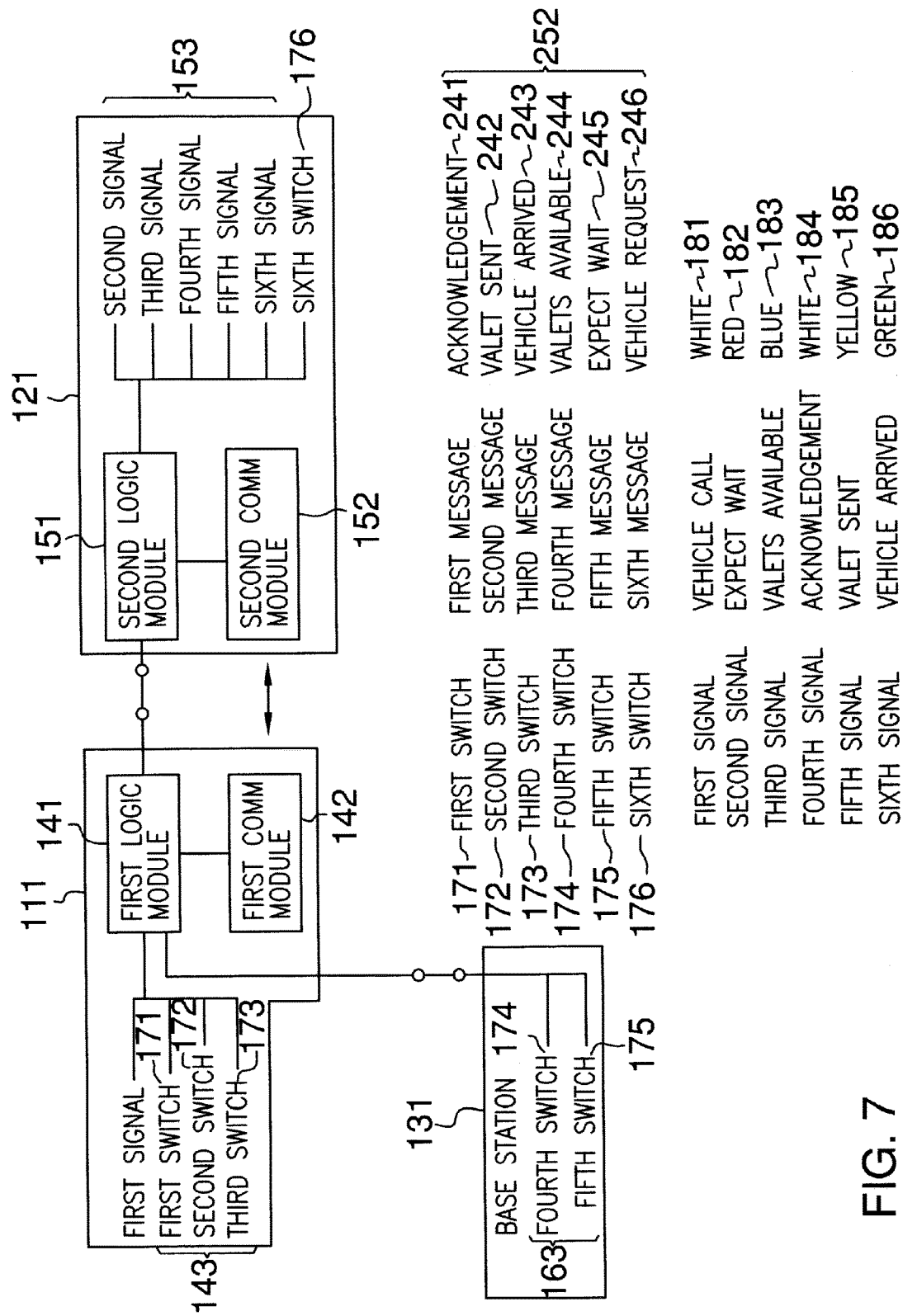
FIG. 7 is a block diagram of an embodiment of the disclosure.
Figure 8:
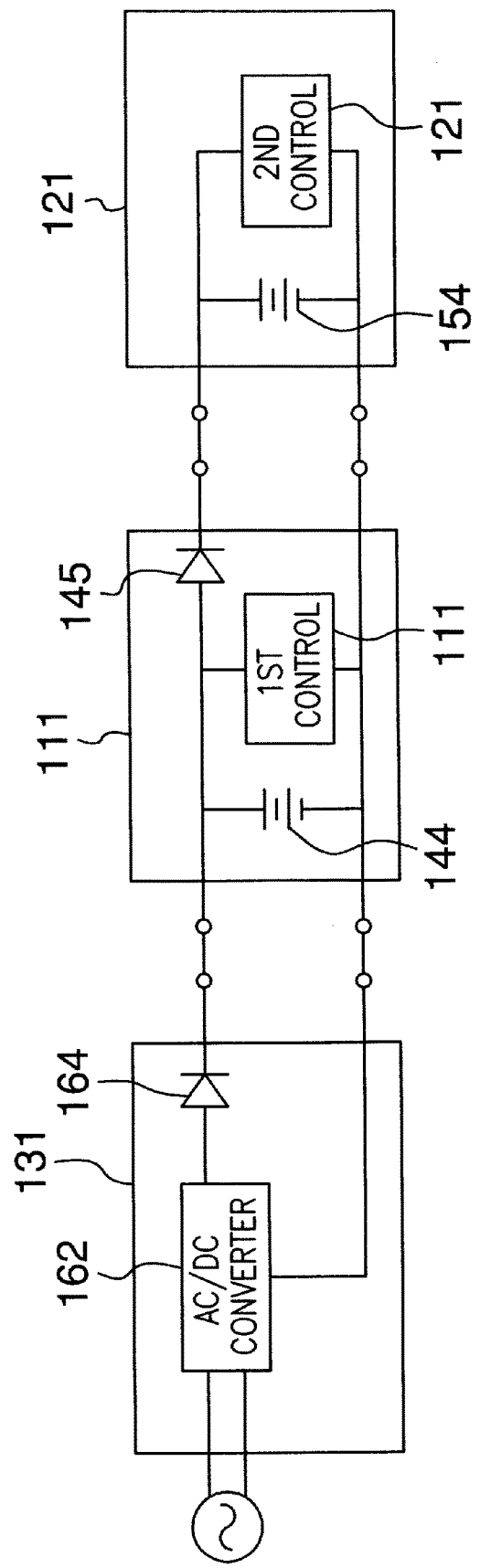
FIG. 8 is a schematic view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 11.

The valet parking and paging system 100 (hereinafter invention) comprises a plurality of valet units 101, a plurality of client units 102, and a base station 103. The plurality of valet units 101 comprises a collection of individual valet units 105. The plurality of client units 102 comprises a collection of individual client units 106. Each individual valet unit 105 selected from the plurality of valet units 101 plugs into and is electrically connected to a location selected from the group consisting of the base station 103 or an individual client unit 106 selected from the plurality of client units 102. The combination of an individual client unit 106 with an individual valet unit 105 forms an individual wireless signaling apparatus 107.

The invention 100 is a wireless signaling apparatus that facilitates communication between a valet parking station and a client of the valet parking station. When not in use, the individual valet unit 105 is plugged into the individual client unit 106 for the purposes of: 1) establishing an electrical connection between the individual valet unit 105 to the individual client unit 106 for the purpose of establishing an identification protocol 251 between the individual valet unit 105 and the individual client unit 106; 2) using a valet battery 144 stored within the individual valet unit 105 to charge a client battery 154 stored within the individual client unit 106; and, 3) to provide for convenient storage of the individual wireless signaling apparatus 107 as a single item. The identification protocol 251 establishes an identification code that allows the individual valet unit 105 and the individual client unit 106 to filter out communications that may be received from a second individual wireless signaling apparatus 107 operating in the vicinity. The identification protocol 251 is reestablished every time the individual valet unit 105 is plugged into the individual client unit 106. The purpose for the reestablishment of the identification protocol 251 is to allow for the "mixing and matching" of individual client units 106 selected from a plurality of client units 102 with individual valet units 105 selected from a plurality of client units 102. This "mixing and matching" allows for the free interchange of components between individual wireless signaling apparatus 107 as may be required for maintenance or management purposes.

The individual wireless signaling apparatus 107 is prepared for use by unplugging and separating the individual valet unit 105 from the individual client unit 106. When the individual wireless signaling apparatus 107 is in use, the client of the valet parking station is given an individual client unit 106 for use by the client through the duration of the client's engagement with the valet parking station. The associated individual valet unit 105 is then plugged into a base station 103 for the purposes of: 1) establishing an electrical connection between the individual valet unit 105 and the base station 103 for the purpose of charging the valet battery 144 contained within the individual valet unit 105; and, 2) establishing an electrical connection between the base station 103 and the individual valet unit 105 allowing the individual valet unit 105 to monitor and receive control signals from the base station 103. When in use, the individual valet unit 105 and the individual client unit 106 exchange a plurality of messages 252 regarding the status of the valet parking station and vehicle of the client. The information exchanged through the plurality of messages 252 is interpreted through a plurality of signals comprising a plurality of client signals 153 and a first signal 181.

The individual valet unit 105 comprises a valet control system 111, a valet plug 112, and a valet housing 113. The valet control system 111 is an electrical circuit that controls the interactions between the individual valet unit 105 and both the individual client unit 106 and the base station 103. The valet housing 113 is a rigid casing that contains the valet control system 111 in such a manner that all switches and signals necessary for the operation of the valet control system 111 by the valet are visible and accessible from the exterior of the valet housing 113. The valet plug 112 is an electrical connection and a physical connection that is used to: 1) physically attach the individual valet unit 105 to an individual client unit 106; 2) physically attach the individual valet unit 105 to the base station 103; 3) electrically connect the valet control system 111 to the client control system 121; and 4) electrically connect the valet control system 111 to the base control system 131.

The individual client unit 106 comprises a client control system 121, a client port 122, and a client housing 123. The client control system 121 is an electrical circuit that controls the interactions between the individual valet unit 105 and the individual client unit 106. The client housing 123 is a rigid casing that contains the client control system 121 in such a manner that all switches and signals necessary for the operation of the client control system 121 by the client are visible and accessible from the exterior of the client housing 123. The client port 122 is an electrical connection and a physical connection that is used to: 1) physically attach an individual valet unit 105 to the individual client unit 106; and, 2) electrically connect the valet control system 111 to the client control system 121.

The base station 103 comprises a base control system 131, a plurality of base ports 132, and a base housing 133. The base control system 131 is an electrical circuit controls the interactions between the individual valet unit 105 and the base station 103. The base housing 133 is a rigid casing that contains the base control system 131 in such a manner that all switches and signals necessary for the operation of the base control system 131 by the client are visible and accessible from the exterior of the client housing 123. Each of the plurality of base ports 132 is an electrical connection and a physical connection that is used to: 1) physically attach an individual valet unit 105 to the base station 103; and, 2) electrically connect the valet control system 111 to the base control system 131.

The valet control system 111 and the client control system 121 exchange a plurality of messages 252. Each of the plurality of messages 252 is a previously specified message that exchanges status information between the valet control system 111 and the client control system 121. The plurality of messages 252 comprises a first message 241, a second message 242, a third message 243, a fourth message 244, a fifth message 245, and a sixth message 246. The first message 241 is generated by the valet control system 111 and is sent to the client control system 121 to acknowledge that the sixth message 246 has been received. The sixth message 246 is a vehicle request and is discussed elsewhere in this paragraph. The second message 242 is generated by the valet control system 111 and is sent to the client control system 121 to indicate that a valet has been sent to retrieve the requested vehicle. The third message 243 is generated by the valet control system 111 and is sent to the client control system 121 to indicate that the requested vehicle is at the valet parking station. The fourth message 244 is generated by the valet control system 111 and is sent to the client control system 121 to indicate valets are immediately available to retrieve a vehicle. The fifth message 245 is generated by the valet control system 111 and is sent to the client control system 121 to indicate valets are not immediately available to retrieve a vehicle and that a delay can be expected in the retrieval of the vehicle. The sixth message 246 is generated by the client control system 121 and is sent to the valet control system 111 to indicate that the client would like their vehicle retrieved.

The client control system 121 comprises a client logic module 151, a client communication module 152, a plurality of client signals 153, a client battery 154, and a sixth switch 176. The client logic module 151 is an electrical circuit that is used to control and operate the client control system 121. The client logic module 151 may be either a programmable device or assembled from discrete electrical and electronic components. The client communication module 152 is a readily and commercially available wireless transceiver that enables wireless communication to exchange the plurality of messages 252 between the valet control system 111 and the client control system 121. The use of transceivers within control circuits are well known and documented in the electrical arts. The design or programming of logic circuits as described in this disclosure are well known and documented in the electrical arts. The client battery 154 is a commercially available battery that provides electrical energy to the client control system 121. As shown most clearly in FIG. 8, when the individual valet unit is plugged into the individual client unit 106 an electrical connection is made between a valet battery 144 in the valet control system 111 and the client battery 154. The valet battery 144 charges the client battery 154. The sixth switch 176 is a commercially available switch that is actuated by the client to initiate the client control system 121 to send a sixth message 246 requesting that the valet parking station retrieve the client's vehicle. Messages are discussed in greater detail elsewhere in this disclosure.

As shown clearly in FIG. 1, the sixth switch 176 is mounted in the client housing 123 such that the sixth switch 176 is recessed into the client housing 123. This recessed mounting prevents the sixth switch 176 from being accidently actuated while the client housing 123 is being carried by a client. The client housing 123 further comprises a transparent cover 124. The transparent cover 124 is mounted on the face of the client housing 123 that is distal from the face of the client housing 123 upon which the sixth switch 176 is mounted. The transparent cover 124 is used to protect operational information displayed on the client housing 123.

Each of the plurality of client signals 153 is a light that is illuminated by the client logic module 151 to indicate to the client the current status of the valet parking station. The plurality of client signals 153 comprises a second signal 182, a third signal 183, a fourth signal 184, a fifth signal 185, and a sixth signal 186. The second signal 182 is a light that is illuminated by the client logic module 151 to indicate that valets are not immediately available to retrieve a vehicle and that a delay can be expected in the retrieval of the vehicle. The third signal 183 is a light that is illuminated by the client logic module 151 to indicate that valets are immediately available to retrieve a vehicle. The fourth signal 184 is a light that is illuminated by the client logic module 151 to acknowledge that the sixth message 246 (vehicle request) has been received. The fifth signal 185 is a light that is illuminated by the client logic module 151 to indicate that a valet has been sent to retrieve the requested vehicle. The sixth signal 186 is a light that is illuminated by the client logic module 151 to indicate that the requested vehicle is at the valet parking station. In the first potential embodiment of the disclosure, each of the plurality of client signals 153 comprises an LED. The second signal 182 is a red LED. The third signal 183 is a blue LED. The fourth signal 184 is a white LED. The fifth signal 185 is a yellow LED. The sixth signal 186 is a green LED.

The valet control system 111 comprises a valet logic module 141, a valet communication module 142, a plurality of valet switches 143, a valet battery 144, a valet diode 145, and a first signal 181. The valet logic module 141 is an electrical circuit that is used to control and operate the valet control system 111. The valet logic module 141 may be either a programmable device or assembled from discrete electrical and electronic components. The valet communication module 142 is a readily and commercially available wireless transceiver that enables wireless communication to the plurality of messages 252 between the valet control system 111 and the client control system 121. The use of transceivers within control circuits are well known and documented in the electrical arts. The design or programming of logic circuits as described in this disclosure are well known and documented in the electrical arts. The first signal 181 is a lamp that is mounted on the valet housing 113 that illuminated by the valet control system 111 to visually indicate that the first message 241 (vehicle request) has been received.

The valet battery 144 is a commercially available battery that provides electrical energy to the client control system 121. As shown most clearly in FIG. 8, when the individual valet unit 105 is plugged into the individual client unit 106 an electrical connection is made between a valet battery 144 in the valet control system 111 and the client battery 154. The valet battery 144 charges the client battery 154. The valet diode 145 is placed between the valet battery 144 and the client battery 154 to prevent the backflow of electricity from client battery 154 to the valet battery 144. When the individual valet unit 105 is plugged into the base station 103 an electrical connection is made between the valet battery 144 in the valet control system 111 and an AC/DC converter 162 contained within the base station 103. The AC/DC converter 162 charges the valet battery 144.

The plurality of valet switches 143 comprises a first switch 171, a second switch 172, and a third switch 173. The first switch 171 is a commercially available switch that is actuated by a valet to initiate the valet control system 111 to send a first message 241 indicating the acknowledgement of receipt of the sixth message 246 requesting a vehicle. The second switch 172 is a commercially available switch that is actuated by a valet to initiate the valet control system 111 to send a second message 242 indicating that a valet has been sent to retrieve the requested vehicle. The third switch 173 is a commercially available switch that is actuated by a valet to initiate the valet control system 111 to send a third message 243 indicating the requested vehicle is at the valet parking station. Messages are discussed in more detail elsewhere in this disclosure.

The base control system 131 comprises a base logic module 161, an AC/DC converter 162, a plurality of base switches 163, and a base diode 164. The base logic module 161 is an electrical circuit that is used to control and operate the base control system 131. The base logic module 161 may be either a programmable device or assembled from discrete electrical and electronic components. The design or programming of logic circuits as described in this disclosure are well known and documented in the electrical arts.

The AC/DC converter 162 is a commercially available device that draws power from the national electric grid and converts the power into a direct current voltage for use by the invention. As shown most clearly in FIG. 8, when the individual valet unit 105 is plugged into the base station 103 an electrical connection is made between the valet battery 144 in the valet control system 111 and an AC/DC converter 162. The AC/DC converter 162 charges the valet battery 144. The base diode 164 is placed between AC/DC converter 162 and the valet battery 144 to prevent the backflow of electricity from the valet battery 144 to the AC/DC converter 162.

The plurality of base switches 163 comprises a fourth switch 174 and a fifth switch 175. As shown most clearly in FIG. 11 the fourth switch 174 and the fifth switch 175 are electrically connected to a first resistor 165 and a second resistor 166 respectively such that: 1) when the fourth switch 174 is actuated the valet logic module 141 detects a change in voltage at its connection point to the fourth switch 174; and 2) when the fifth switch 175 is actuated the valet logic module 141 detects a change in voltage at its connection point to the fifth switch 175. All switches discussed in this disclosure are connected to their respective logic modules in an analogous manner.

The fourth switch 174 is a commercially available switch that is actuated by a valet to initiate the valet control system 111 to send a fourth message 244 indicating that valets are available to retrieve a vehicle. The fifth switch 175 is a commercially available switch that is actuated by a valet to initiate the valet control system 111 to send a fifth message 245 indicating that valets are not immediately available to retrieve a vehicle and that a delay can be expected in the retrieval of the vehicle. Messages are discussed in more detail elsewhere in this disclosure.

Figure 9:
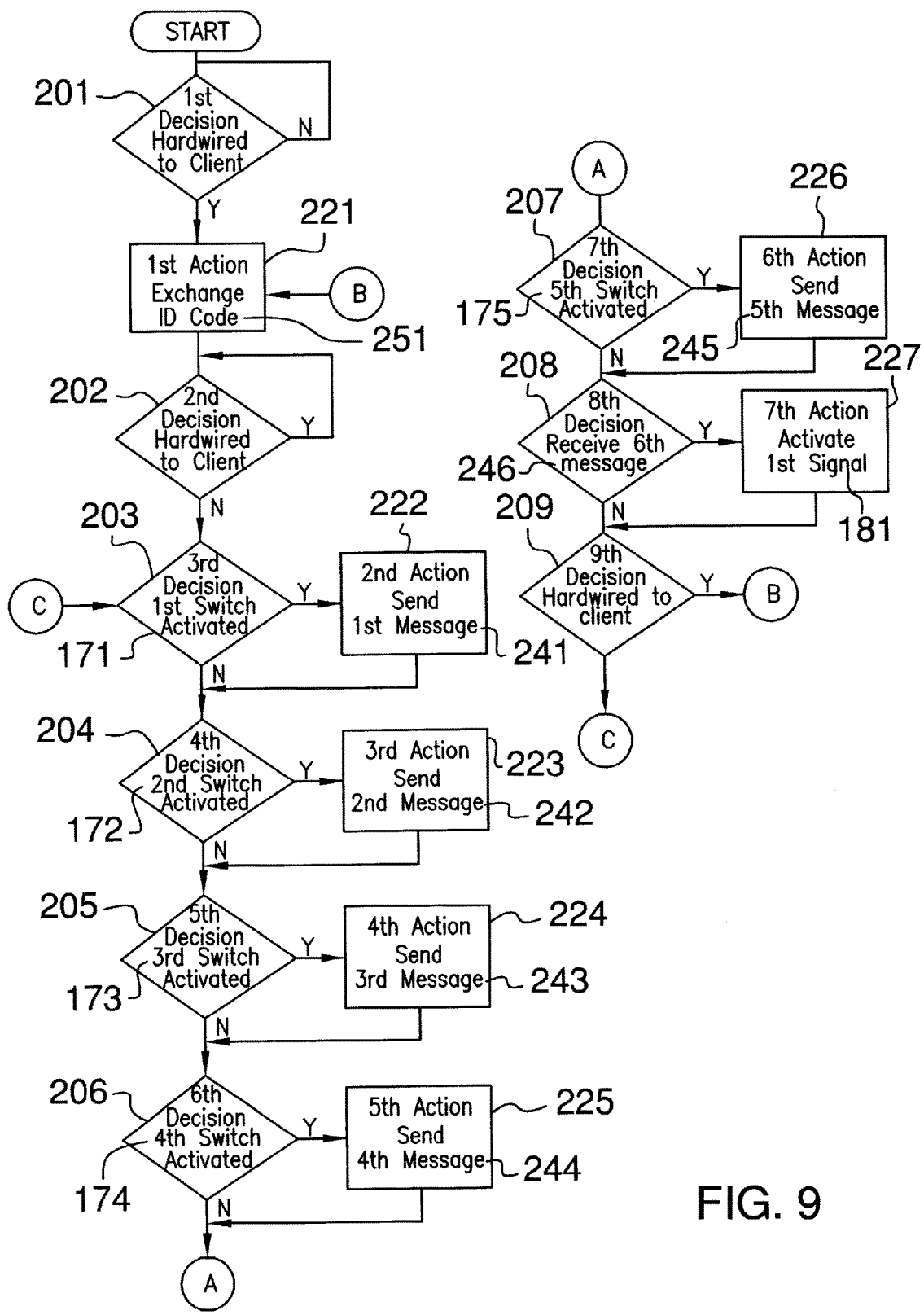
FIG. 9 is a flowchart of an embodiment of the disclosure.

The operating logic of the valet control system 111 is described in the following nine paragraphs as well as in FIG. 9. Because the operational description is organized around logical functions, the following description will essentially follow the organization and format of a flowchart. This use of a flowchart based organization and format is strictly for the purpose clearly explaining the disclosure and is not intended to limit the specification or claims contained within this disclosure. Specifically, this use of a flowchart based organization and format should not be interpreted as requiring the valet control system 111 to contain a programmable device. Those skilled in the electrical arts will recognize that disclosures made in the following nine paragraphs can be readily implemented using electrical circuits that are well known and documented in the electrical arts. These electrical circuits comprise circuits similar to those used in readily and commercially available 433 MHz remote control relays combined with logical switching circuits that are well known and documented in the electrical arts.

The valet control system 111 makes a first decision 201 to determine whether there is a hardwired connection between the valet control system 111 and the client control system 121. If the hardwired connection between the valet control system 111 and the client control system 121 is established then the valet control system 111 proceeds to the first action 221 of implementing the identification protocol 251 by exchanging identification codes with the client control system 121. Once the first action 221 is completed, the valet control system 111 proceeds to the second decision 202. If the hardwired connection between the valet control system 111 and the client control system 121 is not established then the valet control system 111 loops back to the first decision 201.

The valet control system 111 makes a second decision 202 to determine whether there is a hardwired connection between the valet control system 111 and the client control system 121. If the hardwired connection between the valet control system 111 and the client control system 121 is established then the valet control system 111 loops back to the second decision 202. If the hardwired connection between the valet control system 111 and the client control system 121 is not established then the valet control system 111 proceeds to a third decision 203.

The valet control system 111 makes the third decision 203 determines whether the first switch 171 has been actuated. If the first switch 171 has not been actuated then the valet control system 111 then proceeds directly to the fourth decision 204. If the first switch 171 has been actuated then the valet control system 111 takes a second action 222 of sending the first message 241 to the client control system 121 acknowledging the client vehicle request. The valet control system 111 then proceeds to a fourth decision 204.

The valet control system 111 makes the fourth decision 204 to determine whether the second switch 172 has been actuated. If the second switch 172 has not been actuated then the valet control system 111 proceeds directly to a fifth decision 205. If the second switch 172 has been actuated then the valet control system 111 takes a third action 223 of sending a second message 242 to the client control system 121 indicating that a valet has been sent to retrieve the vehicle. The valet control system 111 then proceeds to a fifth decision 205.

The valet control system 111 makes a fifth decision 205 to determine whether the third switch 173 has been actuated. If the third switch 173 has not been actuated then the valet control system 111 proceeds directly to a sixth decision 206. If the third switch 173 has been actuated then the valet control system 111 takes a fourth action 224 of sending a third message 243 to the client control system indicating that the vehicle has arrived at the valet parking station. The valet control system 111 then proceeds to a sixth decision 206.

The valet control system 111 makes a sixth decision 206 to determine whether the fourth switch 174 within the base station 103 has been actuated. If the fourth switch 174 has not been actuated then the valet control system 111 proceeds directly to a seventh decision 207. If the fourth switch 174 has been actuated then the valet control system 111 takes a fifth action 225 of sending a fourth message 244 to the client control system 121 indicating that valets are available to retrieve a vehicle. The valet control system 111 then proceeds to a seventh decision 207.

The valet control system 111 makes a seventh decision 207 to determine whether the fifth switch 175 has been actuated. If the fifth switch 175 has not been actuated then the valet control system 111 proceeds directly to an eighth decision 208. If the fifth switch 175 has been actuated then the valet control system 111 takes a sixth action 226 of sending a fifth message to the client control system 121 indicating that valets are not available to retrieve a vehicle. The valet control system 111 then proceeds to the eighth decision 208.

The valet control system 111 makes the eighth decision 208 to determine whether the sixth message 246 indicating that the client has requested that their vehicle be retrieved has been received. If the sixth message 246 has not been received then then the valet control system 111 proceeds directly to a ninth decision 209. If the sixth message 246 has been received then the valet control system 111 takes a seventh action 227 of activating the first signal 181. The valet control system 111 then proceeds to the ninth decision 209.

The valet control system 111 makes the ninth decision 209 to determine whether there is a hardwired connection between the valet control system 111 and the client control system 121. If the hardwired connection between the valet control system 111 and the client control system 121 is not established then the valet control system 111 loops back to the third decision 203. If the hardwired connection between the valet control system 111 and the client control system 121 is established then the valet control system 111 loops back to the first action 221.

Figure 10:
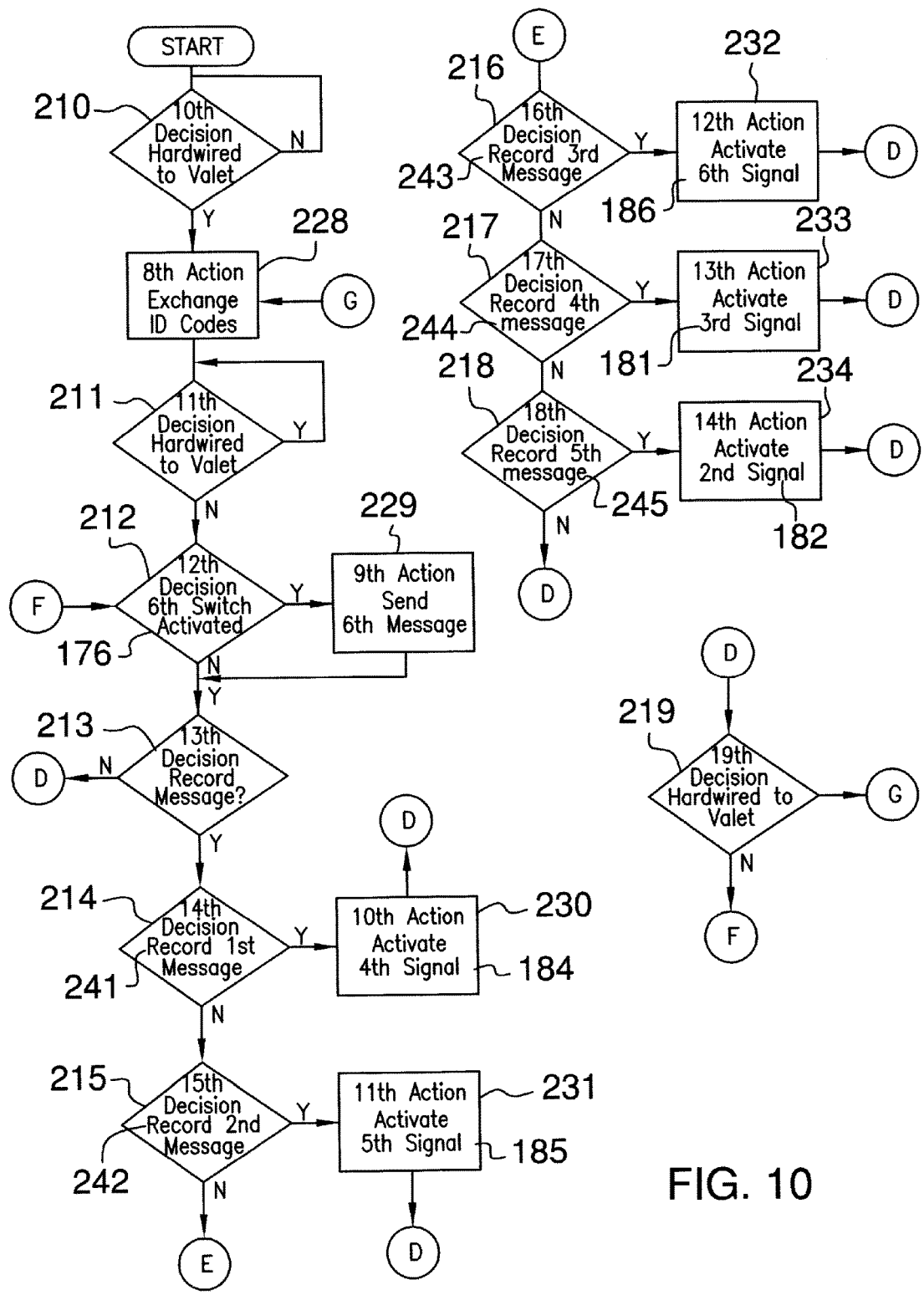
FIG. 10 is a flowchart of an embodiment of the disclosure.
Figure 11:
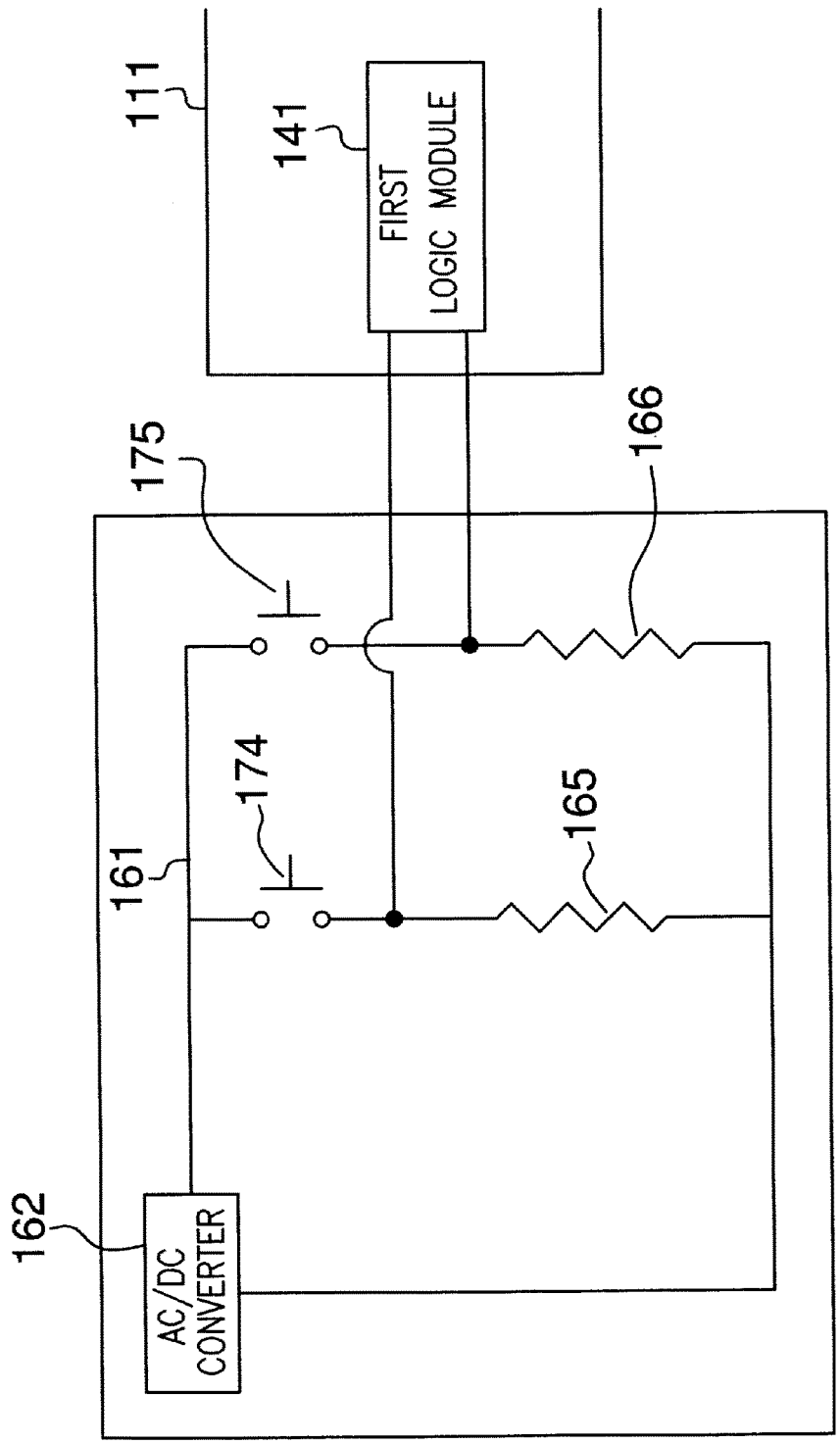
FIG. 11 is a schematic view of an embodiment of the disclosure.

The operating logic of the client control system 121 is described in the following ten paragraphs as well as in FIG. 10. Because the operational description is organized around logical functions, the following description will essentially follow the organization and format of a flowchart. This use of a flowchart based organization and format is strictly for the purpose clearly explaining the disclosure and is not intended to limit the specification or claims contained within this disclosure. Specifically, this use of a flowchart based organization and format should not be interpreted as requiring the client control system 121 to contain a programmable device. Those skilled in the electrical arts will recognize that disclosures made in the following ten paragraphs can be readily implemented using electrical circuits that are well known and documented in the electrical arts. These electrical circuits comprises circuits similar to those used in readily and commercially available 433 MHz remote control relays combined with logical switching circuits that are well known and documented in the electrical arts.

The client control system 121 makes a tenth decision 210 to determine whether there is a hardwired connection between the valet control system 111 and the client control system 121. If the hardwired connection between the valet control system 111 and the client control system 121 is not established then the client control system 121 loops back to the tenth decision 210. If the hardwired connection between the valet control system 111 and the client control system 121 is established then the client control system 121 proceeds to the eighth action 228 of implementing the identification protocol 251 by exchanging identification codes with the valet control system 111. The client control system 121 then proceeds to an eleventh decision 211.

The client control system 121 makes a eleventh decision 211 to determine whether there is a hardwired connection between the valet control system 111 and the client control system 121. If the hardwired connection between the valet control system 111 and the client control system 121 is established then the valet control system 111 loops back to the eleventh decision 211. If the hardwired connection between the valet control system 111 and the client control system 121 is not established then the client control system 121 proceeds to a twelfth decision 212.

The client control system 121 makes a twelfth decision 212 to determine whether the sixth switch 176 has been actuated. If the sixth switch 176 has not been actuated then the valet control system 111 proceeds directly to a thirteenth decision 213. If the sixth switch 176 has been actuated then the client control system 121 takes a ninth action 229 of sending a sixth message 246 to the valet control system 111 indicating that the retrieval of the client's vehicle is requested. The valet control system 111 then proceeds to the thirteenth decision 213.

The client control system 121 makes a thirteenth decision 213 to determine whether a message selected from the plurality of messages 252 has been received. If a message selected from the plurality of messages 252 has not been received then the client control system 121 proceeds to a nineteenth decision 219. If a message selected from the plurality of messages 252 has been received then than the client control system 121 proceeds to a fourteenth decision 214.

The client control system 121 makes a fourteenth decision 214 to determine whether the first message 241 acknowledging that the vehicle request has been received has been received. If the first message 241 has not been received then the client control system 121 proceeds to the fifteenth decision 215. If the first message 241 has been received then the client control 121 takes a tenth action 230 of activating the fourth signal 184. The client control system 121 then proceeds to the nineteenth decision 219.

The client control system 121 makes a fifteenth decision 215 to determine whether the second message 242 indicating that the valet has been sent for the requested vehicle has been received. If the second message 242 has not been received then the client control system 121 proceeds to the sixteenth decision 216. If the second message 242 has been received then the client control system 121 takes an eleventh action 231 of activating the fifth signal 185. The client control system 121 then proceeds to the nineteenth decision 219.

The client control system 121 makes a sixteenth decision 216 to determine whether the third message 243 indicating that the requested vehicle has arrived at the valet parking station has been received. If the third message 243 has not been received then the client control system 121 proceeds to the seventeenth decision 217. If the third message 243 has been received then the client control system 121 takes a twelfth action 232 of activating the sixth signal 186. The client control system 121 then proceeds to the nineteenth decision 219.

The client control system 121 makes a seventeenth decision 217 to determine whether the fourth message 244 indicating that valet is available to a retrieve vehicle has been received. If the fourth message 244 has not been received then the client control system 121 proceeds to the eighteenth decision 218. If the fourth message 244 has been received then the client control system 121 takes a thirteenth action 233 of activating the third signal 183. The client control system 121 then proceeds to the nineteenth decision 219.

The client control system 121 makes a eighteenth decision 218 to determine whether the fifth message 245 indicating that a delay is expected before a valet is available to retrieve a vehicle has been received. If the fifth message 245 has not been received then the client control system 121 proceeds to the nineteenth decision 219. If the fifth message 245 has been received then the client control system 121 takes a fourteenth action 234 of activating the second signal 182. The client control system 121 then proceeds to the nineteenth decision 219.

The client control system 121 makes a nineteenth decision 219 to determine whether there is a hardwired connection between the valet control system 111 and the client control system 121. If the hardwired connection between the valet control system 111 and the client control system 121 is established then the client control system 121 proceeds to the eighth action 228. If the hardwired connection between the valet control system 111 and the client control system 121 is not established then the client control system 121 proceeds to the twelfth decision 212.

The following definitions were used in this disclosure:

AC: As used in this disclosure, AC is an acronym for alternating current.

AC/DC Converter: As used in this disclosure, an AC/DC converter is an electrical device that converts an AC voltage into a DC voltage. Method to design and build AC/DC converters are well known in the electrical arts.

Battery: As used in this disclosure, a battery is a container consisting of one or more cells, in which chemical energy is converted into electricity and used as a source of power.

Control System: As used in this disclosure, a control system is a first device or system that manages and regulates the behavior or operation of a second device or system.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Exterior: As used in this disclosure, the exterior is use as a relational term that implies that an object is not contained within the boundary of a structure or a space.

Housing: As used in this disclosure, a housing is a rigid casing that encloses and protects one or more devices.

Interior: As used in this disclosure, the interior is use as a relational term that implies that an object is contained within the boundary of a structure or a space.

LED: As used in this disclosure, an LED is an acronym for a light emitting diode. A light emitting diode is a diode that is also a light source.

Light: As used in this disclosure, a light is an electrical device that generates visible light to illuminate objects so they can be seen.

Logic Module: As used in this disclosure, a logic module is an electrical device that is programmable and that accepts digital and analog inputs, processes the digital and analog inputs according to previously stored instruction and provides the results of these instructions as digital or analog outputs.

National Electric Grid: As used in this disclosure, the national electric grid is a synchronized and highly interconnected electrical network that distributes energy in the form of electric power from a plurality of generating stations to consumers of electricity.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Relay: As used in this disclosure, a relay is an automatic electromagnetic, electromechanical, or transistor based switching device that reacts to changes in voltage or current by opening or closing a switch in an electric circuit.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to transmit and receive radio signals.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A valet parking system comprising
a plurality of valet units, a plurality of client units, and a base station;
wherein the plurality of valet units comprises a collection of individual valet units;
wherein the plurality of client units comprises a collection of individual client units;
wherein an individual valet unit exchanges a plurality of messages with an individual client unit;
wherein each individual valet unit selected from the plurality of valet units plugs into and is electrically connected to a location selected from the group consisting of the base station or an individual client unit selected from the plurality of client units;
wherein the combination of an individual client unit with an individual valet unit forms an individual wireless signaling apparatus;
wherein the valet parking system is a wireless signaling apparatus that facilitates communication between a valet parking station and a client of the valet parking station;
wherein the individual valet unit is plugged into the individual client unit establishing an electrical connection;
wherein the individual valet unit is plugged into the individual client unit to complete an identification protocol between the individual valet unit and the individual client unit;
wherein the individual valet unit is plugged into the individual client unit to provide an electric charge to the individual client unit;
wherein the identification protocol establishes an identification code that allows the individual valet unit and the individual client unit;

wherein the identification protocol reestablished every time the individual valet unit is plugged into the individual client unit;

wherein the individual valet unit is plugged into the individual client unit can be mixed and matched;

wherein the individual wireless signaling apparatus is prepared for use by unplugging and separating the individual valet unit from the individual client unit;

wherein when the individual wireless signaling apparatus is in use, the client of the valet parking station is given an individual client unit for use by the client through the duration of the client's engagement with the valet parking station;

wherein the associated individual valet unit is then plugged into a base station to establish an electrical connection between the individual valet unit and the base station' wherein the base station provides an electric charge to the individual valet unit;

wherein the base station provides control signals to the individual valet unit.

2. The valet parking system according to claim 1
wherein the individual valet unit comprises a valet control system, a valet plug, and a valet housing;

wherein the valet control system is an electrical circuit that controls the interactions between the individual valet unit and the individual client unit;

wherein the valet control system is an electrical circuit that controls the interactions between the individual valet unit and the base station;

wherein the valet housing is a rigid casing that contains the valet control system in such a manner that all switches and signals necessary for the operation of the valet control system by the valet are visible and accessible from the exterior of the valet housing;

wherein the valet plug is an electrical connection and a physical connection that physically attaches the individual valet unit to an individual client unit;

wherein the valet plug is an electrical connection and a physical connection that physically attaches the individual valet unit to the base station;

wherein the valet plug electrically connect the valet control system to the client control system;

wherein the valet plug electrically connect the valet control system to the base control system.

3. The valet parking system according to claim 2
wherein the individual client unit comprises a client control system, a client port, and a client housing;

wherein the client control system is an electrical circuit that controls the interactions between the individual valet unit and the individual client unit;

wherein the client housing is a rigid casing that contains the client control system in such a manner that all switches and signals necessary for the operation of the client control system by the client are visible and accessible from the exterior of the client housing;

wherein the client port is an electrical connection and a physical connection that physically attaches an individual valet unit to the individual client unit;

wherein the client port electrically connects the valet control system to the client control system.

4. The valet parking system according to claim 3
wherein the base station comprises a base control system, a plurality of base ports, and a base housing;

wherein the base control system is an electrical circuit controls the interactions between the individual valet unit and the base station;

wherein the base housing is a rigid casing that contains the base control system in such a manner that all switches and signals necessary for the operation of the base control system by the client are visible and accessible from the exterior of the client housing;

wherein each of the plurality of base ports is an electrical connection and a physical connection that physically attaches an individual valet unit to the base station;

wherein each of the plurality of base ports electrically connects the valet control system to the base control system.

5. The valet parking system according to claim 4
wherein the client control system comprises a client logic module, a client communication module, a plurality of client signals, a client battery, and a sixth switch;

wherein the client logic module is an electrical circuit that is used to control and operate the client control system;

wherein the client communication module is a wireless transceiver that communicates a plurality of messages between the valet control system and the client control system;

wherein the client battery electrical energy to the client control system;

wherein each of the plurality of client signals is a light that is illuminated by the client logic module;

wherein the plurality of client signals comprises a second signal, a third signal, a fourth signal, a fifth signal, and a sixth signal;

wherein each of the plurality of client signals comprises an LED.

6. The valet parking system according to claim 5
wherein when the individual valet unit is plugged into the individual client unit an electrical connection is made between a valet battery in the valet control system and the client battery;

wherein the valet battery charges the client battery.

7. The valet parking system according to claim 6
wherein the valet control system comprises a valet logic module, a valet communication module, a plurality of valet switches, a valet battery, a valet diode, and a first signal;

wherein the valet logic module is an electrical circuit that is used to control and operate the valet control system;

wherein the valet communication module is a wireless transceiver that enables wireless that communicates the plurality of messages between the valet control system and the client control system;

wherein the first signal is a light that is mounted on the valet housing;

wherein the valet control system illuminates the first signal;

wherein each of the plurality of valet switches comprises a electrical switch;

the plurality of valet switches comprises a first switch, a second switch, and a third switch.

8. The valet parking system according to claim 7
wherein the valet battery charges the client battery;

wherein the valet diode is placed between the valet battery and the client battery to prevent the backflow of electricity from client battery to the valet battery.

9. The valet parking system according to claim 8
wherein the base control system comprises a base logic module, an AC/DC converter, a plurality of base switches, and a base diode;

wherein the base logic module is an electrical circuit that is used to control and operate the base control system;

wherein the AC/DC converter is a device that draws power from the national electric grid and converts the power into a DC voltage for use by the valet parking system;

wherein when the individual valet unit is plugged into the base station an electrical connection is made between the valet battery in the valet control system and an AC/DC converter;

wherein the plurality of base switches comprises a fourth switch and a fifth switch;

wherein the fourth switch is electrically connected to a first resistor such that when the fourth switch is actuated the valet logic module detects a change in voltage at its connection point to the fourth switch;

wherein the fifth switch is electrically connected to a second resistor such that when the when the fifth switch is actuated the valet logic module detects a change in voltage at its connection point to the fifth switch.

10. The valet parking system according to claim 9
wherein the AC/DC converter charges the valet battery;
wherein the base diode is placed between AC/DC converter and the valet battery to prevent the backflow of electricity from the valet battery to the AC/DC converter.

11. The valet parking system according to claim 10
wherein the second signal is a red LED;
wherein the third signal is a blue LED;
wherein the fourth signal is a white LED;
wherein the fifth signal is a yellow LED;
wherein the sixth signal is a green LED.

12. The valet parking system according to claim 4
wherein the client control system comprises a client logic module, a client communication module, a plurality of client signals, a client battery, and a sixth switch;
wherein the client logic module is an electrical circuit that is used to control and operate the client control system;
wherein the client communication module is a wireless transceiver that communicates a plurality of messages between the valet control system and the client control system;
wherein the client battery electrical energy to the client control system;
wherein each of the plurality of client signals is a light that is illuminated by the client logic module;
wherein the plurality of client signals comprises a second signal, a third signal, a fourth signal, a fifth signal, and a sixth signal;
wherein each of the plurality of client signals comprises an LED;
wherein the client control system makes a tenth decision determine whether there is a hardwired connection between the valet control system and the client control system;
wherein the client control system makes a eleventh decision determine whether there is a hardwired connection between the valet control system and the client control system;
wherein the client control system makes a twelfth decision determine whether the sixth switch has been actuated;
wherein the client control system makes a thirteenth decision determine whether a message selected from the plurality of messages has been received;
wherein the client control system makes a thirteenth decision determine whether a message selected from the plurality of messages has been received;
wherein the client control system makes a fourteenth decision determine whether the first message has been received has been received;
wherein the client control system makes a fifteenth decision determine whether the second message has been received;
the client control system makes a sixteenth decision determine whether the third message;
the client control system makes a seventeenth decision determine whether the fourth message indicating that valet is available to a retrieve vehicle has been received;
the client control system makes a eighteenth decision determine whether the fifth message;
the client control system makes a nineteenth decision determine whether there is a hardwired connection between the valet control system and the client control system;
wherein the client control system takes a ninth action of sending a sixth message to the valet control system;
wherein the client control system takes a tenth action of activating the fourth signal;
wherein the client control system takes an eleventh action of activating the fifth signal;
wherein the client control system takes a twelfth action of activating the sixth signal;
wherein the client control system takes a thirteenth action of activating the third signal;
wherein the client control system takes a fourteenth action of activating the second signal;
wherein if the hardwired connection between the valet control system and the client control system is established then the client control system proceeds to the eighth action;
wherein if the hardwired connection between the valet control system and the client control system is not established then the client control system proceeds to the twelfth decision.

13. The valet parking system according to claim 12
wherein when the individual valet unit is plugged into the individual client unit an electrical connection is made between a valet battery in the valet control system and the client battery;
wherein the valet battery charges the client battery.

14. The valet parking system according to claim 13
wherein the valet control system comprises a valet logic module, a valet communication module, a plurality of valet switches, a valet battery, a valet diode, and a first signal;
wherein the valet logic module is an electrical circuit that is used to control and operate the valet control system;
wherein the valet communication module is a wireless transceiver that enables wireless that communicates the plurality of messages between the valet control system and the client control system;
wherein the first signal is a light that is mounted on the valet housing;
wherein the valet control system illuminates the first signal;
wherein each of the plurality of valet switches comprises a electrical switch;
the plurality of valet switches comprises a first switch, a second switch, and a third switch;
wherein the valet control system makes a first decision to determine whether there is a hardwired connection between the valet control system and the client control system;

wherein the valet control system makes a second decision to determine whether there is a hardwired connection between the valet control system and the client control system;

wherein the valet control system makes the third decision determines whether the first switch has been actuated;

wherein the valet control system makes the fourth decision to determine whether the second switch has been actuated;

wherein the valet control system makes a fifth decision to determine whether the third switch has been actuated;

wherein the valet control system makes a sixth decision to determine whether the fourth switch within the base station has been actuated;

wherein the valet control system makes a seventh decision to determine whether the fifth switch within the base has been actuated;

wherein the valet control system makes the eighth decision to determine whether the sixth message has been received;

wherein the valet control system makes a ninth decision to determine whether there is a hardwired connection between the valet control system and the client control system;

wherein the valet control system takes a first action implementing the identification protocol exchanging identification codes with the client control system;

wherein the valet control system takes a second action of sending the first message the client control system;

wherein the valet control system takes a third action of sending a second message to the client control system;

wherein the valet control system takes a fourth action of sending a third message to the client control system;

wherein if the valet control system takes a fifth action of sending a fourth message to the client control system;

wherein the valet control system takes a sixth action of sending a fifth message to the client control system;

wherein the valet control system takes a seventh action of activating the first signal.

15. The valet parking system according to claim 14
wherein the valet battery charges the client battery;
wherein the valet diode is placed between the valet battery and the client battery to prevent the backflow of electricity from client battery to the valet battery.

16. The valet parking system according to claim 15
wherein the base control system comprises a base logic module, an AC/DC converter, a plurality of base switches, and a base diode;

wherein the base logic module is an electrical circuit that is used to control and operate the base control system;

wherein the AC/DC converter is a device that draws power from the national electric grid and converts the power into a DC voltage for use by the valet parking system;

wherein when the individual valet unit is plugged into the base station an electrical connection is made between the valet battery in the valet control system and an AC/DC converter;

wherein the plurality of base switches comprises a fourth switch and a fifth switch;

wherein the fourth switch is electrically connected to a first resistor such that when the fourth switch is actuated the valet logic module detects a change in voltage at its connection point to the fourth switch;

wherein the fifth switch is electrically connected to a second resistor such that when the when the fifth switch is actuated the valet logic module detects a change in voltage at its connection point to the fifth switch.

17. The valet parking system according to claim 16
wherein the AC/DC converter charges the valet battery;
wherein the base diode is placed between AC/DC converter and the valet battery to prevent the backflow of electricity from the valet battery to the AC/DC converter.

18. The valet parking system according to claim 17
wherein the second signal is a red LED;
wherein the third signal is a blue LED;
wherein the fourth signal is a white LED;
wherein the fifth signal is a yellow LED;
wherein the sixth signal is a green LED.

* * * * *